June 2, 1953
J. BERGER
2,640,231
CAR DEFROSTING UNIT
Filed March 31, 1950
3 Sheets-Sheet 1
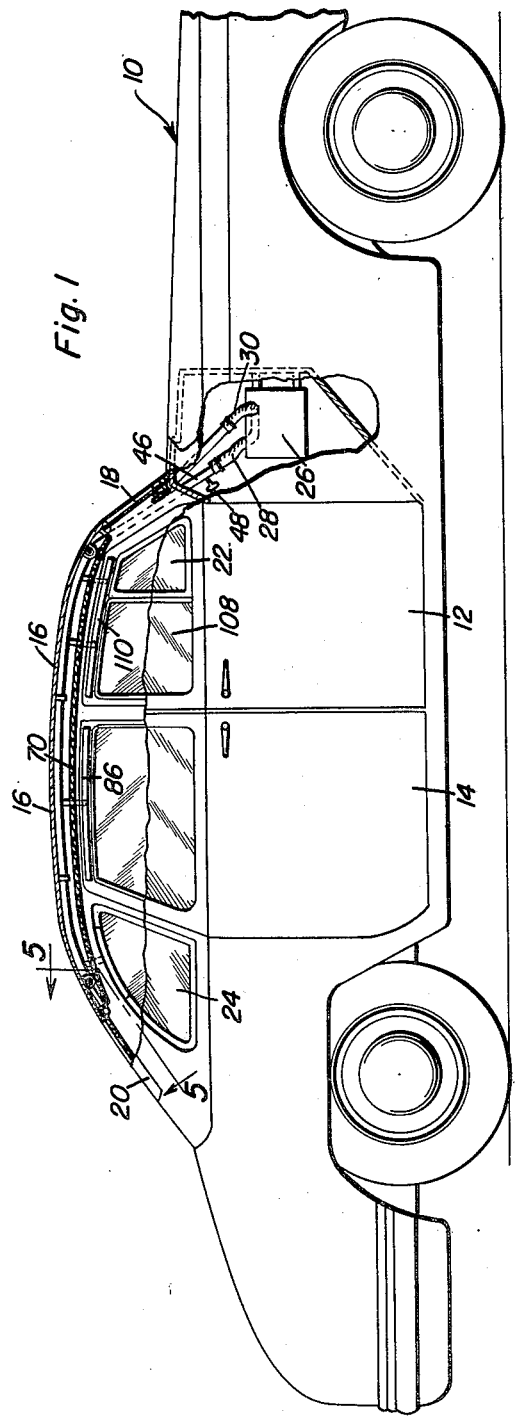
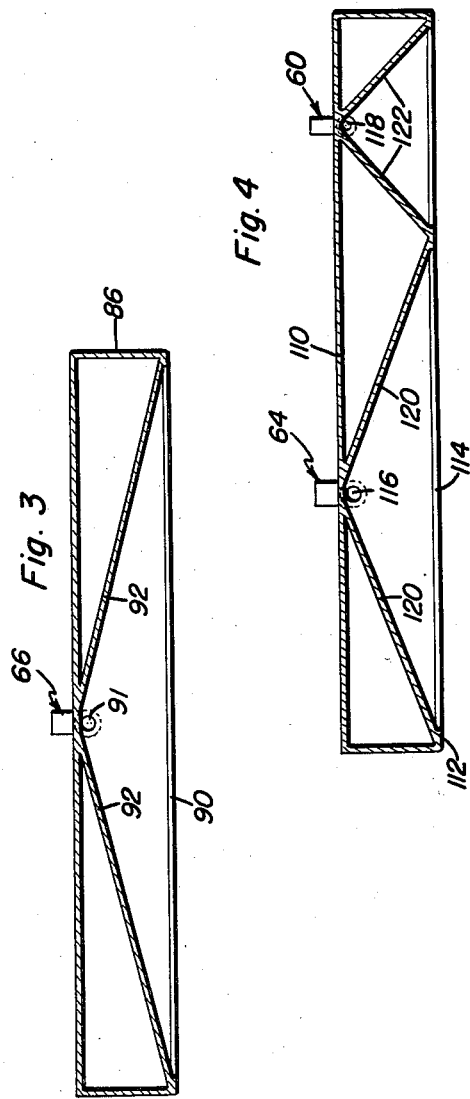
Jacob Berger
INVENTOR.
BY Clarence A. O'Brien
and Harvey B. Jacobson
Attorneys

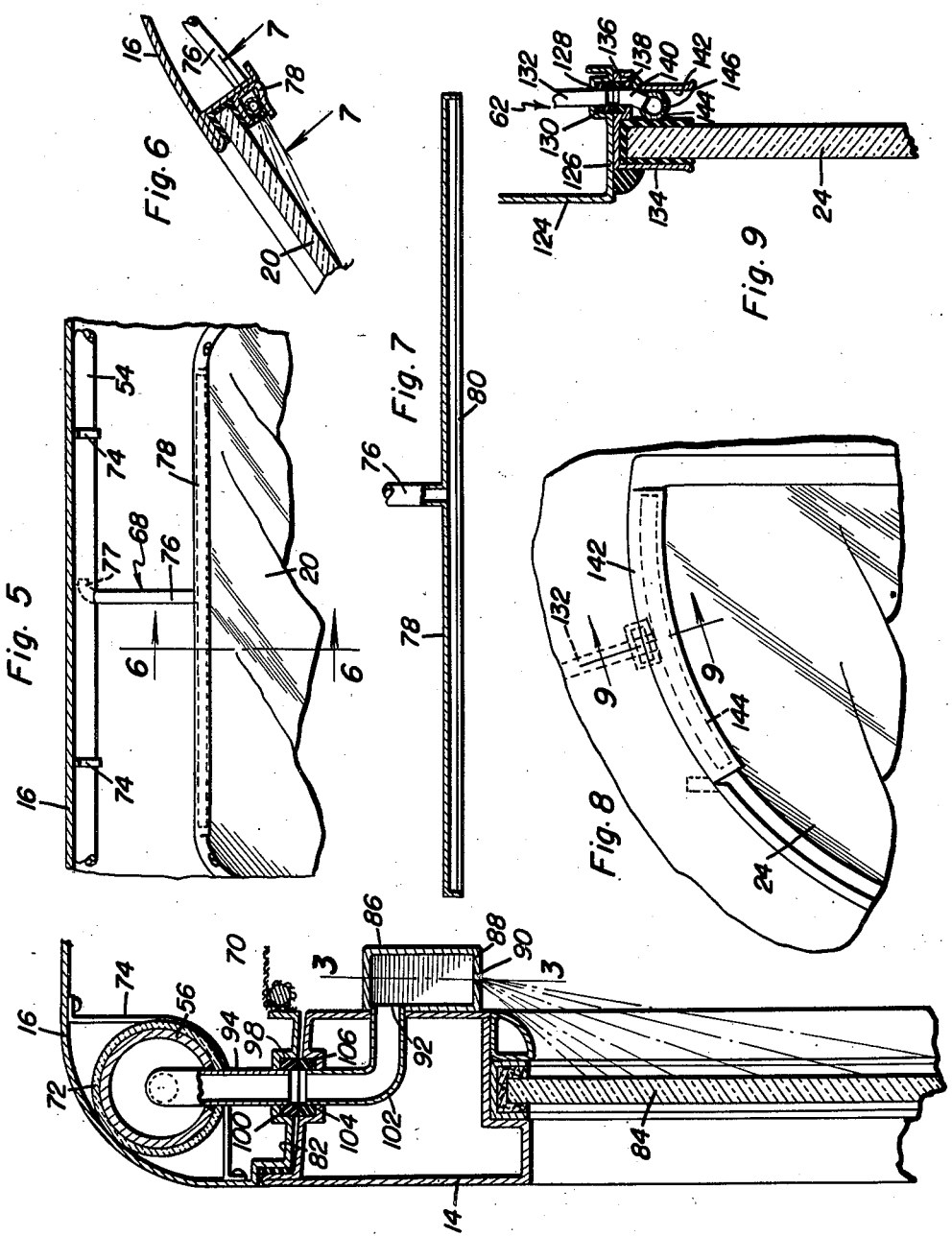

June 2, 1953  J. BERGER  2,640,231
CAR DEFROSTING UNIT
Filed March 31, 1950  3 Sheets-Sheet 3
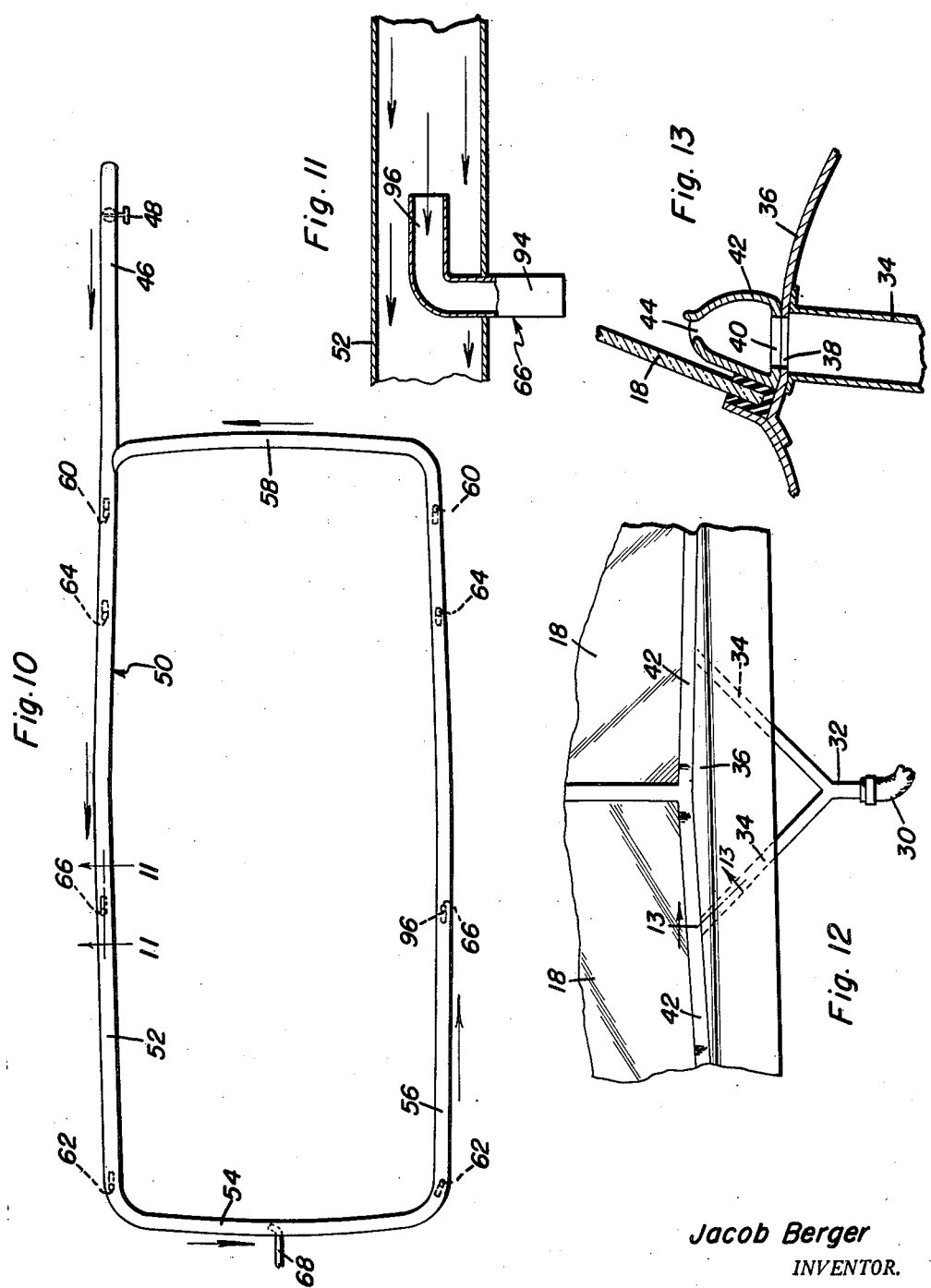
Jacob Berger
INVENTOR.

Patented June 2, 1953

2,640,231

UNITED STATES PATENT OFFICE 2,640,231

CAR DEFROSTING UNIT

Jacob Berger, Chicago, Ill.

Application March 31, 1950, Serial No. 153,177

4 Claims. (Cl. 20—40.5)

This invention comprises novel and useful improvements in a car defrosting unit and more specifically pertains to a combined window defrosting and car heating device for automobile vehicles particularly of the closed body type, although certain aspects of this invention are of more general application for vehicular bodies of automobiles and other conveyances for circulating heating air and for discharging heated air upon the various windows, windshields and glass panes for de-icing and defrosting the same.

The principal object of this invention is to provide a device which shall supply and circulate heated air throughout the interior of an automobile vehicle in a greatly improved manner as regards uniform distribution of the heated air throughout the vehicle, and for directing the heated air upon the various window glasses of the body for defrosting the same.

A further very important object of the invention is to provide a heated air circulating means characterized by an improved manner and construction for mounting and concealing the same in the body of an automobile above the roof upholstery and preferably mounted upon and supported by the roof of the vehicle.

Yet another object of the invention is to provide a device in conformity with the preceding objects which shall distribute and deliver the heated air upon the upper edges of and across substantially the entire width of each of the window glasses, including the windshield and the ventilating panes of an automobile.

A still further important object of the invention is to provide an air circulating and heating device as set forth in the foregoing objects wherein a heating nozzle shall be mounted upon each of the doors of an automobile body, upon the upper portion thereof for directing heated air downwardly across the door window glass; together with an improved detachable conduit connection between such nozzles and a common air supply header concealed and mounted within the upholstery of the roof portion of an automobile.

These, together with various ancillary features and objects of the invention, which will later become apparent as the following description proceeds, are attained by the present invention, a preferred embodiment of which has been illustrated, by way of example only, in the accompanying drawings, wherein:

Figure 1 is a side elevational view showing the principle of this invention applied to an automobile vehicle of a conventional type, parts of the vehicle being broken away in order to show better the manner of applying this invention thereto;

Figure 2 is a vertical transverse sectional detail view upon an enlarged scale showing the manner of applying an air discharge nozzle to the window glass of one of the vehicle doors;

Figure 3 is a vertical longitudinal sectional view taken substantially upon the plane indicated by the section line 3—3 of Figure 2 and showing the construction of one of the heated air delivery nozzles for the window glasses of the doors of the automobile vehicle;

Figure 4 is a view similar to Figure 3 but showing the construction of heated air delivery nozzle employed for the front door and the front door glass ventilating pane of an automobile vehicle;

Figure 5 is a fragmentary horizontal sectional taken substantially upon the plane indicated by the broken section line 5—5 of Figure 1 and showing the arrangement of the air discharge nozzle for the rear glass of an automobile vehicle;

Figure 6 is a vertical transverse sectional detail view taken substantially upon the plane indicated by the section line 6—6 of Figure 5;

Figure 7 is a further vertical sectional detail view taken substantially upon the plane indicated by the section line 7—7 of Figure 6;

Figure 8 is a fragmentary elevational view of a portion of a rear ventilating window or pane showing the heated air discharge nozzle associated therewith;

Figure 9 is a vertical transverse sectional detail view taken substantially upon the plane indicated by the section line 9—9 of Figure 8;

Figure 10 is a diagramamtic view showing the conduit system of the present invention;

Figure 11 is a fragmentary vertical longitudinal sectional view taken substantially upon the plane indicated by the section line 11—11 of Figure 10;

Figure 12 is a fragmentary elevational view, taken from the interior of the automobile and showing a portion of the windshield glasses together with the conduit connections of the heater applied to the lower edges of the same; and Figure 13 is a vertical transverse sectional view taken substantially upon the plane indicated by the section line 13—13 of Figure 12.

Referring now more specifically to the accompanying drawings, wherein like numerals designate similar parts throughout the various views, attention is directed first to Figure 1 wherein it will be seen that the invention is applied to a conventional form of automobile of the closed body type, the automobile being indicated by the numeral 10 and including a pair of conventional front doors 12, rear doors 14, the conventional metallic top 16, a pair of windshield panes 18, a rear window pane 20, together with front and rear ventilating windows or panes 22 and 24.

In addition, there is disclosed a conventional form of hot air heater 26 by means of which air may be heated and circulated throughout the interior of the automobile body. Since the construction of such heaters are in themselves old and well known, and the present invention does not depend upon any specific construction of heater, it has not been deemed necessary to illustrate and describe the details of construction or the mounting of the heater 26. However, this heater in accordance with conventional practice is provided with a pair of flexible air delivery conduits 28 and 30, the former which customarily delivered heated air into the body portion of the automobile vehicle and adjacent the floor being employed in accordance with the present invention to deliver the heated air through the conduit system disclosed hereinafter, while the conduit 30 supplies a portion of the heated air in conformity with conventional practice to the customary windshield defrosters disclosed in Figures 12 and 13.

Referring next to Figures 12 and 13, it will be seen that the customary defroster conduit 30 delivers the heated air as by a Y-shaped coupling or conduit connection 32 and pair of passages 34, to the lower edges of the windshield glasses 18. For this purpose, the exit ends of the conduits 34, as shown in Figure 13, are suitably secured to the under surface of the instrument panel or dash 36 of the vehicle, and communicate by means of an aperture 38 therein with a corresponding aperture 40 in a defroster nozzle assembly or casing 42 extending across the length of the lower edge of the windshield glass, and having a discharge nozzle or vent 44 for directing air upwardly upon the windshield glass across the width of the same.

The previously described defroster construction for the windshield glasses of the automobile vehicle are, of course, of a conventional design, and do not in themselves constitute a part of the invention claimed hereinafter.

Reference is next made to Figure 10 which shows diagrammatically the manner in which a conduit system is employed for delivering heated air supplied by the flexible conduit 28 from the heater 26 throughout the interior of the automobile in accordance with this invention. The flexible conduit 28 communicates with a pipe or conduit 46 which may conveniently extend either alongside of or through the hollow interior of one of the windshield corner posts, the pipe 46 being provided with a manually controlled valve indicated at 48 for controlling the flow of air therethrough. The conduit 46, in turn, communicates with a header indicated generally by the numeral 50 and which is of generally rectangular shape and which constitutes a loop or closed passageway, appropriately shaped and proportioned to extend about the edges of the roof of an automobile. As illustrated, the header includes a longitudinally extending pipe or conduit 52 which may directly communicate with the passageway 46, and which extends along the same side of the automobile vehicle. At its rear end, the conduit 52 communicates with transverse conduit 54 extending across the back of the automobile vehicle, this conduit, in turn, communicating with a third conduit 56 extending longitudinally of and along the upper edge of the other side of the automobile vehicle, from which by means of a transverse conduit 58, the circulating heated air is discharged again into the conduit 52.

Obviously, the header 50 may be of any desired construction, either being formed as a unitary header or manifold assembly, or as a plurality of separately connected and removable sections.

Along its length, the header 50 is provided with a plurality of heated air discharge connections by means of which the heated air circulated through the header may be discharged at each of the windows or glasses of the vehicle body. Thus, the conduit connections 60 and 62 respectively communicate with the nozzles which supply heated air to the ventilating windows or panes of the front door windows and rear windows of the vehicle, while the connections 64 and 66 respectively supply heated air to the front and rear windows of the front and rear doors of the vehicle. Finally, the connection 68 supplies and delivers heated air to the nozzle associated with the rear glass of the vehicle body. It is evident that the header 50 may be supported and mounted within the interior of the vehicle in various ways. Conveniently and preferably, however, the header is mounted in a concealed manner between the metallic roof 16 and the roof upholstery 70, see Figures 1 and 2, of the automobile body, the various conduit or pipe sections of the header being suitably encased in a protective, sound-deadening and cushioning sheathing 72, see Figure 2, and supported against the metallic roof 16 of the vehicle body as by mounting brackets or straps 74, as clearly shown in Figure 2.

Reference is next made to Figures 5–7 for an understanding of the construction, mounting and arrangement of the heated air discharge nozzle for the rear window 20.

At any convenient point, such as intermediate its ends, the transverse rear conduit section 54 of the header 50 is provided with the abovementioned heated discharge connection 68. As shown in Figure 5, this connection may comprise a pipe or hose 76 having an inlet end 77 inserted in the conduit 54 and facing toward the direction of flow of the heated air, the latter being indicated by the arrows in Figure 10. The member 76 at its lower extremity communicates with a horizontally and transversely extending casing 78 which is mounted in any suitable manner upon the upper portion of the metallic framing of the rear window 20, and which is provided at its lower edge with a slot 80 which discharges the heated air, as indicated more clearly in Figure 6, downwardly upon the rear glass 20 at and across substantially the entire width of the upper edge of this glass.

Attention is next directed to Figures 2 and 3 for an understanding of the construction of delivery nozzle, its mounting and its conduit supply system for the front and rear doors of the vehicle body.

In Figure 2 there is disclosed a view of the rear door and its frame, with the heated air delivery nozzle and its connections associated therewith. It will be understood that the front door and frame are of similar construction, except that the heated air delivery nozzle, which is likewise adapted to supply heated air to the front ventilating window 22, is of a modified construction as shown in Figure 4.

The door framing of the rear door 14 is provided with a conventional form of door lintel 82, adapted to have the customary sealing engagement with the upper portion of the rear door 14. The rear doors 14 are further provided with the customary rear windows 84 mounted in suitable window guide channels and operated by the conventional window glass elevating mechanism not shown. Mounted in any desired manner upon the interior wall of the upper portion of the rear door 14, is a heated air delivery nozzle in the form of a casing 86 which preferably extends across the entire width of the upper portion of the rear door. This casing 86 is provided with a bottom wall 88 disposed in a substantially horizontal plane, this bottom wall having a longitudinally extending slot 90 constituting a heated air exhaust vent, this slot being directed and positioned to discharge the heated air against the upper portion of the window glass 84 across substantially the entire width of the same, as suggested by the showing in Figure 2.

The casing 86, as shown in the sectional view of Figure 3, is provided at its upper edge and substantially intermediate its ends with an inlet port 91, and a pair of baffles 92 are secured to the interior of the casing and extend from opposite sides of the inlet port 91 downwardly to opposite ends of the casing 86. These baffles 92 thus constitute directing surfaces for reflecting the heated air discharged into the casing 86 from the discharge connection 66, downwardly through the slot 90.

The above described discharge connection 66 is provided for delivery of heated air from the header 50 into the nozzle casing 86. This connection 66 includes a stationary conduit 94 mounted in the door framing of the lintel above the rear door 14, and provided with an inlet portion 96 facing towards the direction of flow of the heated air within the header 50 as shown by the arrows in Figure 11. The lower end of the section 94 extends into a chambered portion 98 of the lintel 82, this chambered portion receiving a deformable sealing member 100 which may be of a suitable plastic, rubber or the like. The connecting member 66 further includes a movable, L-shaped conduit section 102 which is mounted in the upper portion of the door 14, and has one extremity extending into the inlet port 92 of the nozzle casing 86, and having its other extremity extending into a chambered recess 104 in the upper edge or surface of the door 14, this chamber being likewise provided with a sealing member 106.

The arrangement of movable and stationary conduits is such that when the door is in the closed position as shown in Figure 2, the conduit sections 94 and 102 will be in register with each other, and the sealing means 100 and 106 will establish a sealing engagement. However, when the door is open, the conduit sections will be relatively displaced without difficulty.

It will thus be seen that provision is made for opening or closing the doors and for breaking or re-establishing a conduit connection between the nozzle members carried by the doors and the header assembly carried by the vehicle roof and within the upholstery recess of the same.

The construction described in connection with Figure 2 as applied to the rear door 14, is identically formed and constructed with respect to the front doors 12. However, since the front door 12 includes both the vertically movable window glass 108 and the horizontally pivoting ventilating pane or window 22, a slightly different form of nozzle assembly is mounted upon the front door to accommodate these two glasses. As shown in Figure 4, the front door nozzle 110 comprises a casing similar to the casing 86, being provided along its bottom wall 112, with a longitudinally extending slot 114 positioned to direct the issuing heated air against the upper edge of the front window glass 108 and the front ventilating window 22. For this purpose, the casing 110 is provided with inlet ports 116 and 118, at the upper portion of the nozzle casing, for respective connection with the connecting conduits 64 and 60. Each of these conduits, as shown in Figure 10, is provided with an adit extending into the header and in a direction towards the oncoming stream of heated air. The other ends of these conduits extend into the ports 116 and 118 in the casing 110. Secured in the casing 110 and extending from opposite sides of the ports 116 and 118, are downwardly extending baffles 120 on opposite sides of the port 116 and baffles 122 on opposite sides of the port 118, these baffles respectively directing the heated air downwardly against the window 108 and the ventilating pane 22.

The couplings 64 and 60 may be of the same construction described in connection with the coupling assembly 66 disclosed in Figure 2, for establishing a conduit connection between the relatively movable nozzle assembly 110 mounted upon the front door 12 and the relatively stationary header conduit 56.

Attention is now directed more specifically to Figures 8 and 9 in conjunction with Figure 10, wherein there is disclosed the manner in which the nozzle assembly is installed and connected for delivering heated air to the rear ventilating window 24. As shown best in Figures 8 and 9, the rear window 24 is hingedly mounted in a frame 124 for pivotal movement about a substantially vertical axis. The frame 124 is provided with a horizontally disposed lower surface 126 which has an upwardly recessed chamber 128 provided with a packing 130 of the same character as that set forth in connection with the packing 100 of Figure 2, and into which extends the terminus of a conduit 132 forming a part of the stationary conduit of the discharge connector 62. The upper edge of the ventilating window pane 24 is provided with a metallic channel-shaped member 134 embracing the top edge and upper portions of the inner and outer surfaces of the pane, this channel member being provided with a recessed chamber 136 receiving a packing 138 and an angulated movable conduit 140 adapted to register with the stationary conduit 132. The channel member 134 is provided with a depending wall 142 by means of which there is clamped a tubular air discharge nozzle 144 between this depending wall and the adjacent edge of the glass pane 24, this nozzle having a longitudinally extending slot 146 on its lower surface which directs heated air downwardly upon the pane 24.

The operation of this nozzle assembly is substantially identical with that set forth in connection with the nozzle assembly of Figure 2.

It will thus be apparent that there has been provided a conduit assembly for promoting the circulation of heated air throughout the interior of an automobile vehicle; for discharging the heated air upon all of the glass panes of the vehicle for defrosting the same; and which is mounted in an unobtrusive and satisfactorily concealed manner.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

Having described the invention, what is claimed as new is:

1. A window defroster and car heater comprising a ring-like heated air header disposed in the roof of a car and adjacent the sides thereof, means supplying heated air to said header, warm air discharge nozzles positioned adjacent a car window glass for discharging heated air thereon and means connecting said nozzles to said header, one of said discharge nozzles being mounted upon the upper portion of a car door upon the interior thereof, said connecting means for said last mentioned nozzle including a conduit extending into the upper surface of a car door and movable therewith.

2. A window defroster and car heater comprising a ring-like heated air header disposed in the roof of a car and adjacent the sides thereof, means supplying heated air to said header, warm air discharge nozzles positioned adjacent a car window glass for discharging heated air thereon and means connecting said nozzles to said header, one of said discharge nozzles being mounted upon the upper portion of a car door upon the interior thereof, said connecting means for said last mentioned nozzle including a conduit extending into the upper surface of a car door and movable therewith, and a stationary conduit communicating with said header and registerable with said movable conduit when said door is closed and extending through the frame of said door.

3. A window defroster and car heater comprising a ring-like heated air header disposed in the roof of a car and adjacent the sides thereof, means supplying heated air to said header, warm air discharge nozzles positioned adjacent a car window glass for discharging heated air thereon and means connecting said nozzles to said header, one of said discharge nozzles being mounted upon the upper portion of a car door upon the interior thereof, said connecting means for said last mentioned nozzle including a conduit extending into the upper surface of a car door and movable therewith, and a stationary conduit communicating with said header and registerable with said movable conduit when said door is closed and extending through the frame of said door, a sealing connection carried by said car door and frame for said movable and stationary conduits.

4. The combination of claim 3 wherein said nozzles comprise a casing having an open lower end, air inlet for the upper portion of said casing, baffles extending from said inlet to the lower end of said casing.

JACOB BERGER.

References Cited in the file of this patent

UNITED STATES PATENTS

| Number | Name | Date |
|---|---|---|
| 1,982,591 | Davis | Nov. 27, 1934 |
| 2,036,230 | Mulneaux | Apr. 7, 1936 |
| 2,133,438 | Stearns | Oct. 18, 1938 |
| 2,146,826 | Knapp | Feb. 14, 1939 |
| 2,150,110 | Strauss et al. | Mar. 7, 1939 |
| 2,169,664 | Shifflett | Aug. 15, 1939 |
| 2,295,146 | Welch | Sept. 8, 1942 |
| 2,391,408 | Galamb et al. | Dec. 25, 1945 |
| 2,492,506 | Stinnett | Dec. 27, 1949 |

FOREIGN PATENTS

| Number | Country | Date |
|---|---|---|
| 56,096 | Denmark | Apr. 24, 1939 |